Oct. 11, 1932.  A. G. HEGGEM  1,881,555
OIL SAVER
Filed May 22, 1930    2 Sheets-Sheet 1
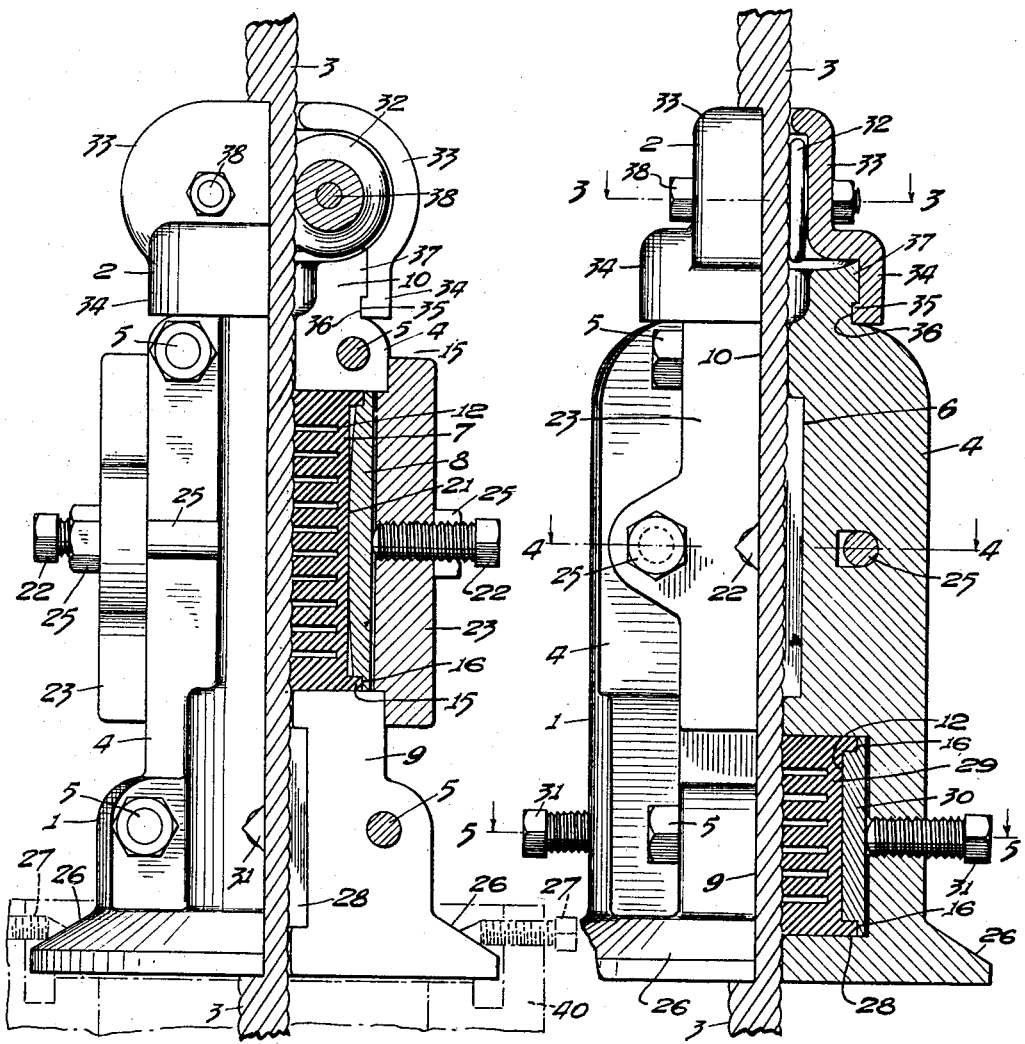
INVENTOR
Alfred G. Heggem
by Ritter & Ritter
his ATTORNEYS Oct. 11, 1932.   A. G. HEGGEM   1,881,555
OIL SAVER
Filed May 22, 1930   2 Sheets-Sheet 2

INVENTOR
Alfred G. Heggem
BY
Ritter & Ritter
his ATTORNEYS

Patented Oct. 11, 1932

1,881,555

UNITED STATES PATENT OFFICE

ALFRED G. HEGGEM, OF TULSA, OKLAHOMA

OIL SAVER

Application filed May 22, 1930. Serial No. 454,739.

My invention relates to oil savers especially suitable for packing a flexible wire line or cable such as is employed in the drilling of oil wells.

The principal object of the invention is to provide an oil saver or stuffing box for efficiently packing the reciprocating line or cable of an oil well drilling apparatus so as to check the escape of oil around the drilling line, thus preventing the wasting of oil as well as reducing the fire hazard.

A further object of the invention is to provide a form of oil saver which, while being readily manufactured, is well adapted for packing a drilling line against leakage of oil even though the well pressure may be relatively great.

A still further object of the invention is to provide an oil saver which is capable of being readily coordinated with the casing head and drilling line so as to permit the oil saver to perform its functions in the most efficient manner.

A primary feature of the invention consists in forming the stuffing box of a pair of separable members which are spaced apart intermediate of their ends to form recesses or chambers for receiving the flexible packings which cooperate with the drilling line and which also receive the followers through which pressure is applied to the packings.

Another principal feature of the invention consists in providing the oil saver with a swivel top or turret upon which are mounted oppositely disposed rollers for cooperating with the drilling line that is to be packed, the swivel top being adapted to be adjustably secured in position.

There are other features of the invention residing in advantageous details and relations of parts, as will hereinafter appear and be pointed out in the claims.

In the drawings illustrating a preferred form of the invention:

Figure 1 is a view, partly in side elevation and partly in vertical section, of an oil saver embodying the invention, a casing head upon which it is mounted being shown in dot and dash lines and a portion of the drilling line or cable with which it cooperates being also illustrated.

Figure 2 is a view, partly in elevation and partly in vertical section, of the construction shown in Figure 1, the view being taken at right angles to that shown in Figure 1.

Figure 6 is a vertical central section of one of the packing followers.

Figure 7 is a plan view of one of the followers.

Figure 8 is a horizontal sectional view of one of the followers.

Figure 9 is a vertical central section of one of the packing elements.

Figure 10 is a horizontal section of one of the packing members.

Figure 3:
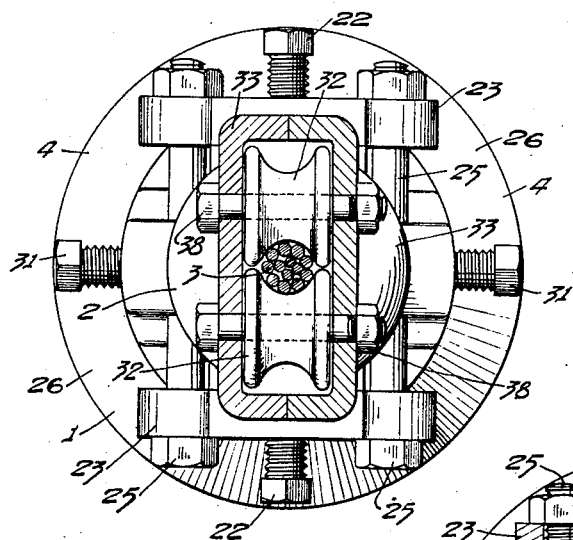
Figure 3 is a horizontal sectional view on the line 3—3, Figure 2.
Figure 4:
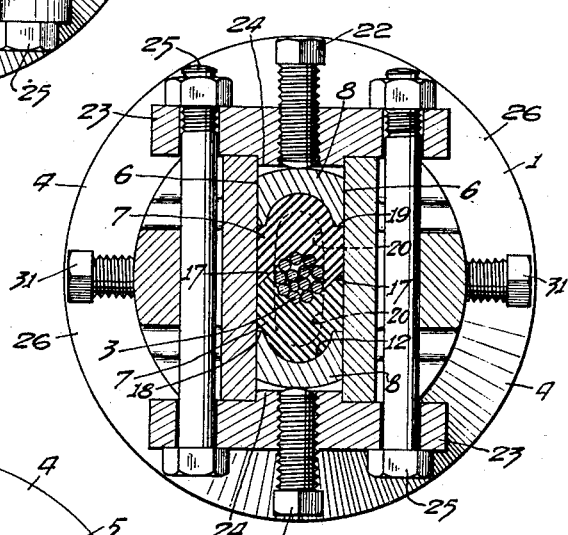
Figure 4 is a horizontal sectional view on the line 4—4, Figure 2.
Figure 5:
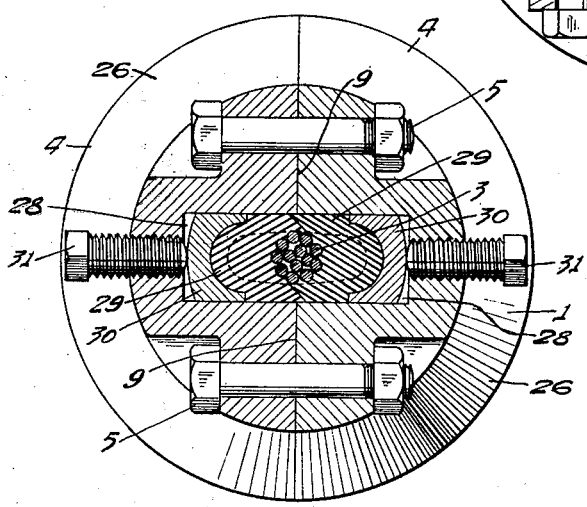
Figure 5 is a horizontal sectional view on the line 5—5, Figure 2.

The stuffing box 1 is preferably of the double packed type, being provided at its lower end with auxiliary packing members which may be forced into contact with the drilling line when the upper or principal packing rubbers require replacement because of wear. The stuffing box 1 and its swivel top 2 are divided longitudinally so that they may be conveniently applied to and removed from the drilling line 3 without cutting the latter.

The stuffing box involves complemental sections or members which are preferably connected rigidly by means of transversely extending bolts 5. Between their ends each of the stuffing box sections 4 is recessed on its inner face as indicated at 6. These recesses are in opposed relation and form a transversely extending slot which is in the line of division of the stuffing box 1. The slot thus formed receives the principal packings 7 and their respective followers 8. By forming the upper packing chamber as an open ended slot which extends through the stuffing box in the line of division or separation of the latter, the slot may be machined true to receive a close fitting rubber packing member 7 and true-machined close fitting followers 8. The advantage of close fitting followers will be immediately apparent, for the efficiency of the packing in preventing leakage of the oil is determined by the strength and resilience of the packing member and this strength, of course, depends upon the extent of the unsupported area of the packing member. Forming the upper packing chamber as a transversely extending slot in the line of parting of the stuffing box also effects the advantage of reducing the extent of metallic contact of the two halves of the box from bottom to top by limiting the metal to metal joint to the contact surfaces 9 and 10 respectively located below and above the intervening packing chamber. The possibility of leakage by any distortion of the joint surfaces is thus minimized as the distance in which the distortion may become effective is lessened. As there is less wear on the tool in machining the joint surfaces 9 and 10 than would be the case if the metal to metal joint between the two halves of the stuffing box continued the full length of the latter the whole joint may be more accurately formed as a true plane, thus insuring effectiveness of the joint. Moreover, should there be a leak vertically through the joint it would not continue throughout the length of the oil saver but would be stopped by the packing rubbers 7 which bridge the line of division or parting of the stuffing box sections 4.

The packing members 7 in the upper packing chamber of the stuffing box are preferably of rubber. Each is adapted to be forced by its respective follower 8 into packing contact with the reciprocating element or drilling line 3 so as to prevent loss of oil or other fluid. As shown in the drawings, the packing members 7 are preferably formed with curved inner faces 11 and their backs are convexly curved as indicated at 12 to fit into the corresponding recesses 13 of the followers 8. The sides of these packing rubbers are flat parallel surfaces conforming to and abutting the lateral walls of the packing chamber in which they are disposed, and the top and bottom faces or ends 14 of the packing elements 7 are also preferably flat surfaces lying in planes normal to the sides. At their opposite ends the packing elements 7 are also preferably formed with rearwardly projecting sealing flanges or lips 15 which overlap the ends of the respectively adjacent followers 8, said followers being appropriately recessed, as at 16, to receive these flanges. The contacting inner edges of the oppositely disposed packing elements 7 are bevelled as indicated at 17 so as to enable the packing rubbers to overlap each other circumferentially with respect to the reciprocating member that is to be packed. The back face of each of the packing elements 7 is formed with vertically extending shoulders 18 which are engaged by corresponding vertically extending shoulders 19 on the inner face of the adjacent follower 8. The pressure of the shoulders 19 of the followers upon the cooperating shoulders 18 of the packings expands the latter at the shoulders and thereby increases the tightness of contact of the sides of the packing rubbers with the stuffing box. Each of the flexible packing members 7 is formed with a series of grooves 20 which not only enhance the flexibility of the packing by dividing it into tongues or laminations but which also afford voids or spaces into which the rubber may expand locally in order to allow the inner face of the packing to conform itself to the inequalities of the surface of a wire drilling line 3. As shown in the drawings, the bottom of the curved recess 13 in each of the followers 8, instead of being of straight line form, may be slightly convex, as indicated at 21, so that the rubber 7 against which it bears will have firmest contact against the drilling line 3 at the central portion of the packing and the latter will be somewhat free to yield radially at both ends to permit it to adapt itself to unusual inequalities. The particular form of packing member 7 shown and described has been chosen for purposes of illustration, because it is well adapted for the intended purpose of packing a reciprocating drilling line; but it is to be understood that the details of construction of the packing are not herein claimed and are not essential to this invention.

The followers 8 by which the packing elements 7 are forced against the drilling line are preferably actuated by adjusting screws 22 having threaded engagement with members 23 which may advantageously be in the form of plates constituting covers for the outer ends of the transversely extending slot in the stuffing box in which the packing 7 and followers 8 are received. For the purpose of centering the cover plates 23 they may be provided on their inner faces with projections 24 which enter the transversely extending slot of the stuffing box; and said plates are preferably secured rigidly in position by means of bolts 25 which extend transversely of the stuffing box on opposite sides of the packing chamber thereof.

As a means for rigidly mounting the oil saver on the casing head 40 of a well, each stuffing box section 4 is preferably fashioned at its lower end with a tapering semi-circular flange 26 adapted for cooperation in the well-known manner with set screws 27 which have threaded engagement with the casing head.

Below the packing chamber in which the packing rubbers 7 are located, each of the stuffing box sections 4 is cored out or recessed, as indicated at 28, to receive an auxiliary packing member 29 and its cooperating follower 30. The packing elements 29 and the followers 30 are preferably identical respectively with the packing members 7 and followers 8 heretofore described, although of somewhat less length. The followers 30 are adapted to be actuated to force the lower packing rubbers 29 into contact with the drilling line by means of adjusting screws 31 having threaded engagement with the corresponding stuffing box sections 4 upon which they are mounted. When it becomes necessary to replace the packing rubbers 7, the screws 31 are properly manipulated to cause the lower packing rubbers 29 to pack tightly against the drilling line, whereupon the upper packing rubbers 7 may be removed without escape of oil.

At the upper end of the oil saver are a plurality of oppositely disposed rollers 32 which cooperate with the flexible drilling line 3 so as to prevent the sideway of the latter, which normally accompanies the drilling motion of the line, from communicating to the packing rubbers 7 sidewise thrusts impairing the efficiency of the packing. These guide rollers 32 are adjustably mounted upon the stuffing box so that their axes of rotation may be caused to extend in a direction normal to the plane of sidewise swaying of the drilling line. By this means the guide rollers are enabled to be always positioned so as most effectively to perform their functions.

To enable the guide rollers 32 to be readily brought into proper cooperation with the drilling line after the stuffing box has been secured to the casing head 25, the rollers are preferably mounted on a turret or swivel top 2, which is swivelled on the upper end of the stuffing box. The turret which may advantageously extend over the guide rollers so as to form a housing therefor, is preferably split or constituted of oppositely disposed sections 33, each of which is provided with a semi-cylindrical lower portion or skirt 34 having an inturned flange 35. Each of the half sections 4 of the stuffing box is formed with a semicircular groove 36 corresponding to the inturned lugs 35 of the swivel top and above these grooves each stuffing box section is provided at its upper end with a semi-cylindrical projection 37 which is adapted to contact with and form a journal bearing for the semi-cylindrical skirts 34. The bolts 38 forming the axles upon which the guide rollers 32 turn extend transversely through both sections 33 of the turret 2, thus providing means for tightly clamping the turret on the top of the stuffing box.

I claim:

1. An oil saver involving a stuffing box formed of separable sections divided from each other by a joint extending lengthwise of the box, said sections being provided intermediate of their ends with spaced portions forming an open-ended slot extending transversely of the stuffing box in the division joint of the latter, means for connecting said sections, a plurality of packing elements disposed in said slot, and means respectively associated with said packing elements for forcing them toward the longitudinal axis of the box.

2. An oil saver involving a stuffing box formed of separable sections divided from each other by a joint extending lengthwise of said box, said sections being provided intermediate of their ends with spaced portions forming an open-ended slot of uniform cross-section, said slot extending transversely of the stuffing box in the division joint of the latter, means for connecting said separable stuffing box sections, a plurality if packing elements disposed in said slot and adapted to engage the walls of the latter, and means for respectively forcing said packing elements toward the longitudinal axis of the box.

3. An oil saver involving a stuffing box formed of separable contacting sections divided from each other by a joint extending lengthwise of said box, said box being provided between its ends with a packing chamber which interrupts the line of contact between said sections, means for rigidly connecting said stuffing box sections, a plurality of packing elements disposed in said packing chamber, and means for forcing the respective packing elements toward the longitudinal axis of the box.

4. An oil saver involving a stuffing box formed of separable sections divided from each other by a joint extending lengthwise of the box, said sections being provided intermediate of their ends with spaced portions forming a packing chamber extending transversely of the box in the division joint of the latter, a plurality of packing elements disposed in said packing chamber, means respectively associated with said packing elements for forcing them towards the longitudinal axis of the box, each of said stuffing box sections being recessed at its lower end to receive an auxiliary packing element, said recesses constituting a packing chamber extending transversely across said division joint of the box, packing elements respectively disposed in said recesses, means for forcing said last-named packing elements toward the longitudinal axis of the box, and means for rigidly connecting the stuffing box sections.

5. An oil saver involving a stuffing box formed of separable sections divided from each other by a joint extending lengthwise of the box, said sections being provided intermediate of their ends with spaced portions forming an open-ended slot extending transversely of the stuffing box in the division joint of the latter, means for rigidly connecting said sections, a plurality of packing elements disposed in said slot, a plurality of followers disposed in said slot and respectively adapted to force said packing elements toward the longitudinal axis of the box, plates extending across the ends of said slot and rigidly secured to said stuffing box sections, and adjusting screws respectively mounted on said plates for actuating said followers.

6. An oil saver involving a stuffing box formed of separable sections divided from each other by a joint extending lengthwise of the box, said box being provided with a packing chamber intermediate of its ends, means for rigidly connecting said stuffing box sections, a plurality of resilient packing elements disposed in said packing chamber, a plurality of followers respectively engaging said packing elements for forcing them toward the longitudinal axis of the box, the faces of said followers which are in contact with said packing elements being convexly curved lengthwise of the box, and means for actuating said followers to cause them to force the packing elements toward the longitudinal axis of the box.

7. An oil saver involving a stuffing box formed of separable sections divided from each other by a joint extending lengthwise of the box, said sections being provided intermediate of their ends with spaced portions forming an open-ended slot extending transversely of the stuffing box in the division joint of the latter, means for connecting said sections, a plurality of packing elements disposed in said slot, a plurality of followers disposed in said slot and each adapted to force one of said packing elements toward the longitudinal axis of the box, a plurality of cover plates closing the outer ends of said slot, means for maintaining said plates in assembled relation, and means carried by said plates for cooperating with the respective followers to force said packing elements toward the longitudinal axis of the stuffing box.

8. An oil saver involving a stuffing box provided intermediate of its ends with a packing chamber, packing means disposed within said chamber, means for forcing said packing means toward the longitudinal axis of the box, a plurality of guide rollers disposed above said packing chamber and adapted to cooperate with a flexible reciprocating element, and means for adjustably mounting said rollers upon said box to permit lateral angular shifting of the axes of said rollers with respect to said box.

9. An oil saver involving a stuffing box provided intermediate of its ends with a packing chamber, packing means within said chamber, a plurality of guide rollers disposed above said packing chamber, and means having swivelled connection with said box for mounting said rollers on the latter.

10. An oil saver involving a stuffing box provided intermediate of its ends with a packing chamber, packing means within said chamber, a plurality of guide rollers disposed above said packing chamber and adapted to cooperate with a flexible reciprocating element, a mounting for said rollers, said mounting and said stuffing box having overlapping portions forming a swivel connection between them and said mounting comprising separable sections divided from each other lengthwise of the stuffing box, and bolts for clamping said sections to the stuffing box, said bolts forming axles for the said rollers.

11. An oil saver involving a stuffing box provided intermediate of its ends with a packing chamber, packing means within said chamber, a turret mounted on the upper end of said stuffing box so as to be rotatably adjustable with respect to the latter, means for preventing longitudinal movement of the turret with respect to the stuffing box, a plurality of guide rollers mounted on said turret and adapted to cooperate with a flexible reciprocating element, and axles for the respective rollers, said turret comprising a plurality of sections divided from each other lengthwise of the stuffing box, and each of said axles being supported by said turret sections.

12. In an oil saver involving a stuffing box for a reciprocating element, said stuffing box being formed of contacting sections divided from each other by a joint extending lengthwise of said box, said box being provided between its ends with a packing chamber formed in said joint and disposed on both sides of the contacting surfaces between said sections, means for rigidly connecting said stuffing box sections, a plurality of packing elements disposed in said packing chamber, and means for forcing the respective packing elements toward the longitudinal axis of the box.

In testimony whereof I affix my signature.
ALFRED G. HEGGEM.